United States Patent [19]

Fry et al.

[11] 4,389,502
[45] Jun. 21, 1983

[54] CLEAR AIR-DRY ACRYLIC LACQUER COATING COMPOSITION

[75] Inventors: Grant C. Fry; Walter C. Meyer, both of Lake Orion, Mich.

[73] Assignee: E. I. Du Pont de Nemours and Company, Wilmington, Del.

[21] Appl. No.: 334,161

[22] Filed: Dec. 24, 1981

[51] Int. Cl.$^3$ ............................................. C08L 1/14
[52] U.S. Cl. ...................................... 524/37; 524/38; 428/461; 428/532
[58] Field of Search .................... 524/37, 38; 428/532, 428/461

[56] References Cited

U.S. PATENT DOCUMENTS 3,823,205  7/1974  Zimmt ................................ 260/901
4,168,249  9/1979  Meyer ................................. 260/16

*Primary Examiner*—John Kight, III
*Assistant Examiner*—Nathan M. Nutter
*Attorney, Agent, or Firm*—Hilmar L. Fricke

[57] ABSTRACT

An air-dry acrylic lacquer capable of forming a low-color, non-yellowing finish with excellent adhesion to either lacquer or enamel-coated substrates is provided. The lacquer is composed primarily of poly(methyl methacrylate), a methyl methacrylate/ethyl acrylate/t-butylaminoethyl methacrylate terpolymer, cellulose acetate butyrate, and a polyester plasticizer. Ordinarily, the lacquer is nonpigmented and provides a clear, glossy and durable film useful as the clear coat of a color coat/clear coat automotive finish.

13 Claims, No Drawings

CLEAR AIR-DRY ACRYLIC LACQUER COATING COMPOSITION

BACKGROUND OF THE INVENTION

Much of the research and development effort in the field of automotive finishes is currently directed to the development of color coat/clear coat automotive finishes. It has been found that an excellent appearance, with depth of color and with metallic glamour, can be obtained by applying a transparent coat over a pigmented coat. Unfortunately, the durability of these transparent clear coats has left much to be desired. Often, checking, cracking and flaking occur after relatively short periods of exposure to weathering, necessitating costly refinishing.

An iminated acrylic lacquer coating composition exhibiting excellent durability is disclosed by Meyer, U.S. Pat. No. 4,168,249, issued Sept. 18, 1979. In addition to durability, this unique lacquer also exhibits the ability to adhere to either lacquer or enamel finishes. This latter property makes the Meyer lacquers attractive for across-the-board use in refinish shops as well as for original equipment finishes. When utilized *without pigmentation,* however, this and other iminated lacquers display a tendency to yellow over a period of time, rendering them unsuitable for color coat/clear coat finishes.

The novel composition of this invention displays all the advantages of the Meyer composition, viz., durability and lacquer/enamel adhesion, without the concomitant disadvantage of excessive yellowing.

SUMMARY OF THE INVENTION

This clear acrylic lacquer coating composition consists essentially of 5–40% by weight of a film-forming binder and 60–95% by weight of volatile organic solvents; wherein the binder consists essentially of:

(a) about 0–65% by weight, based on the weight of the binder, of one or more polymers selected from the group consisting of poly(methyl methacrylate) and other copolymers of methyl methacrylate having a relative viscosity of about 1.17 to 1.20 measured at 25° C. on a 0.5% polymer solids solution using dichloroethylene solvent;

(b) about 0–25% by weight, based on the weight of the binder, of cellulose acetate butyrate having a viscosity of about 1–20 seconds and a butyryl content of 20–55% by weight;

(c) about 10–40% by weight, based on the weight of the binder, of a polyester plasticizer comprising the reaction product of a polyol and an organic dicarboxylic acid or an anhydride of an organic dicarboxylic acid having an acid number of 0.1–10;

(d) about 0–10% by weight, based on the weight of the binder, of a phthalate plasticizer; and (e) about 15–80% by weight, based on the weight of the binder, of a terpolymer of units of methyl methacrylate, ethyl acrylate, and t-butylaminoethyl methacrylate;

wherein (a), (b), (c), (d) and (e) total 100%.

DESCRIPTION OF THE INVENTION

The clear acrylic lacquer coating composition of the present invention, particularly suitable for use as the clear coat of a color coat/clear coat automotive finish, provides coatings possessing a combination of resistance to outdoor weathering, smoothness, a high level of gloss, and vastly diminished "in-the-can" yellowing.

The coating composition has a binder content of film-forming constituents of about 5–40% by weight. The remaining 60–95% of the composition is a solvent blend for the binder.

The acrylic polymers utilized in the coating composition are prepared by solution polymerization, wherein the monomers are blended with solvent and polymerization catalyst and are heated to about 75°–150° C. for 2–6 hours to form polymers having relative viscosities of about 1.17–1.20, measured at 0.5% polymer solids at 25° C. with dichloroethylene solvent.

Typical solvents used to prepare the acrylic polymers include toluene, ethyl acetate, acetone, ethylene glycol monoethylether acetate, methylethyl ketone, isopropyl alcohol, and other aliphatic, cycloaliphatic and aromatic hydrocarbons conventionally used for this purpose.

About 0.1–4% by weight, based on the weight of the monomers, of polymerization catalyst is used in the preparation of the acrylic polymers. Typical catalysts include azobisisobutyronitrile, azobis-$\alpha,\gamma$-dimethylvaleronitrile, benzoyl peroxide and t-butylpivalate.

A chain transfer agent can be used to control the molecular weight of the acrylic polymers. Typical chain transfer agents include $\alpha$-mercaptoethanol, dodecylmercaptan, benzene thioethanol, mercaptosuccinic acid, butylmercaptan and mercaptopropionic acid.

The coating composition contains about 0–65% and preferably about 40–80% by weight, based on the weight of the binder, of poly(methyl methacrylate) and/or other copolymers of methyl methacrylate. A preferred composition also contains about 15–80% by weight and preferably about 2–20% by weight, based on the weight of the binder, of a terpolymer of units of methyl methacrylate, ethyl acrylate, and t-butylaminoethyl methacrylate. Ordinarily, the terpolymer will consist of about 20–90% by weight of units of methyl methacrylate, 2–40% by weight of units of ethyl acrylate, and 2–60% by weight of units of t-butylaminoethyl methacrylate. Excellent coating compositions can also be obtained, however, with significantly greater amounts of t-butylaminoethyl methacrylate. Poly(t-butylaminoethyl methacrylate) may be used in place of the methyl methacrylate/ethyl acrylate/t-butylaminoethyl methacrylate terpolymer. A preferred terpolymer consists essentially of about 60–90% by weight of units of methyl methacrylate, 10–20% by weight of units of ethyl acrylate, and 2–20% by weight of units of t-butylaminoethyl methacrylate.

Up to about 25%, preferably 5–25% by weight, based on the weight of the binder, of cellulose acetate butyrate is used in the coating composition. The cellulose acetate butyrate has a butyryl content of about 30–55% by weight and a viscosity of about 1–20 seconds, measured according to ASTM D-1343-56. Preferably, low viscosity cellulose acetate butyrate having a butyryl content of about 35–40% by weight and a viscosity of 1–3 seconds is used.

The composition contains about 10–40% by weight, based on the weight of the binder, of a polyester plasticizer containing the reaction product of a polyol, an organic dicarboxylic acid or an anhydride thereof having an acid number of about 0.1–10, and, optionally, a saturated fatty oil or fatty acid. The plasticizer is prepared by conventional polymerization techniques, wherein the constituents and a conventional esterification catalyst such as lead tallate, sodium naphthenate, barium oxide, barium hydroxide, or lithium hydroxide are reacted at 80°-200° C. for about 0.5-6 hours. Typical polyols that can be used to prepare the polyester include ethylene glycol, propylene glycol, dipropylene glycol, butane diol, diethylene glycol and neopentyl glycol. Other polyols that can be used are glycerol, trimethylol propane, trimethylol ethane, pentaerythritol, dipentaerythritol, and sorbitol. Typical organic dicarboxylic acids or anhydrides that can be used to prepare the polyester include adipic acid, azelaic acid, chlorendic acid, chlorendic anhydride, phthalic acid, phthalic anhydride, terephthalic acid, isophthalic acid, succinic acid, succinic anhydride, trimelletic acid, and trimelletic anhydride. A typical saturated fatty oil that can be used to prepare the polyester is coconut oil. Polyesters of a polyol and an organic dicarboxylic acid or anhydride thereof can additionally be reacted with a monocarboxylic acid rather than a fatty oil or acid. A preferred plasticizer contains neopentyl glycol, adipic acid, and benzoic acid.

It is recommended that the coating composition be fortified with at least one ultraviolet light stabilizer or ultraviolet screener to prevent degradation of the resultant finish by ultraviolet light. Highly preferred for this purpose is a combination of an ultraviolet screener and a hindered amine light stabilizer. The coating composition will contain about 0-6% by weight, based on the weight of the binder, of this combination, preferably about 0.5-3% by weight of a hindered amine light stabilizer and about 0.5-3% by weight of an ultraviolet screener. Preferred ultraviolet screeners include 2-(o-hydroxyphenyl)benzotriazoles, nickel chelates, o-hydroxybenzophenones, and phenyl salicylates. Highly preferred are the 2-(o-hydroxyphenyl)benzotriazoles.

While the coating composition will ordinarily be nonpigmented, it is acceptable, for clear coat use, to incorporate transparent particles, i.e., pigments having a refractive index the same as or similar to the refractive index of the film-forming constituents, in a pigment-to-binder weight ratio of about 1/100 to 150/100. Conventional pigments, e.g., inorganic pigments, metallic powders and flakes, organic dyes, organic pigments, and lakes, may also be added, in these same weight ratios, if the coating composition is to be employed other than as the clear coat of a clear coat/color coat finish.

The composition may, of course, contain additional additives, e.g., silicones, that are typically incorporated into acrylic lacquer coating compositions.

The coating composition can be applied over a variety of substrates, e.g., metal, primed metal, metal coated with enamels or lacquers, wood, glass, plastics, and the like, by spraying, electrostatic spraying, dipping, brushing, flow-coating, or any other conventional application method. Ordinarily, it will be sprayed onto a color-coated automotive substrate to form a color coat/clear coat finish.

The applied coating can be dried at ambient temperatures or, alternatively, can be baked at relatively low temperatures, e.g., 35°-100° C., for about 15 minutes-2 hours.

The resulting finish has an excellent appearance and can be rubbed or polished with conventional techniques to improve its smoothness or gloss or both. The finish is hard and resistant to weathering, staining, and scratching. It adheres well to all of the aforementioned substrates.

The present invention will be more readily understood from the following illustrative example, wherein all quantities, percentages, and ratios are on a weight basis unless otherwise indicated.

EXAMPLE

I. Preparation of methyl methacrylate/ethyl acrylate/t-butylaminoethyl methacrylate polymer solution

|  | Parts |
| --- | --- |
| Portion 1 | |
| Methyl methacrylate monomer, hydroquinone - inhigited (55 p.p.m.) | 169.13 |
| Ethyl acrylate monomer | 47.87 |
| t-Butylaminoethyl methacrylate monomer, hydroquinone - inhigited (850-1350 p.p.m.) | 15.97 |
| Ethyl acetate | 105.69 |
| Butyl acetate | 82.76 |
| Portion 2 | |
| 2,2'-Azobisisobutyronitrile | 0.45 |
| Ethyl acetate | 5.98 |
| Portion 3 | |
| Methyl methacrylate monomer, inhibited as above | 79.78 |
| t-Butylaminoethyl methacrylate, inhibited as above | 6.38 |
| Toluene | 3.97 |
| Portion 4 | |
| 2,2'-Azobisisobutyronitrile | 0.80 |
| Ethyl acetate | 7.98 |
| Toluene | 8.00 |
| Portion 5 | |
| 2,2'-Azobisisobutyronitrile | 0.90 |
| Ethyl acetate | 11.97 |
| Toluene | 12.00 |
| Portion 6 | |
| Isopropyl alcohol | 59.84 |
| Toluene | 79.78 |
| Acetone | 99.73 |
| Total | 798.98 |

Portion 1 is charged into a reaction vessel equipped with a thermometer, a stirrer, a reflux condenser, and a heating mantle, and is heated to reflux, about 94° C. The heat is then removed. Portion 2 is quickly added to the vessel, and the resulting reaction mixture is held for about 10 minutes. Next, Portions 3 and 4 are added simultaneously over a period of 60 minutes, and the reaction mixture is again held for 10 minutes. Portion 5 is then added over a period of 90 minutes; heat is supplied as needed to maintain reflux or a minimum temperature of 90° C. over a 15 minute holding period. At the end of this period, the heat is removed and Portion 6 is added to dilute the reaction mixture; 10 minutes of mixing follows.

The resulting polymer solution has a solids content of about 38.5-40.5 and a relative viscosity of about 1.17-1.20, measured at 25° C. on a 0.5% polymer solids solution using dichloroethylene solvent. The polymer contains about 78% methyl methacrylate, 15% ethyl acrylate, and 7% t-butylaminoethyl methacrylate.

II. Preparation of neopentyl glycol/adipic acid/benzoic acid polyester plasticizer

|  | Parts |
| --- | --- |
| Portion 1 | |
| Neopentyl glycol solution | |

| | Parts |
|---|---|
| (90% in water) | 406.00 |
| Portion 2 | |
| Adipic acid | 385.00 |
| Benzoic acid | 203.70 |
| Dibutyltin oxide | 0.30 |
| Portion 3 | |
| Toluene | 43.64 |
| Portion 4 | |
| Toluene | 48.49 |
| Total | 1087.13 |

An inert gas blanket should be maintained throughout the following procedure in order to prevent darkening of color. Portion 1 is charged into a reaction vessel and heated to about 65° C. This temperature is maintained while Portion 2 is added. Next, Portion 3 is added and the reaction mixture is heated to its reflux temperature of about 138° C. The temperature of the mixture is then increased to about 160° C. and held there for one hour. A series of temperature increases and holding periods follows: the mixture is heated to about 182° C. and held at that temperature for 15 minutes, heated to about 204° C. and held for 15 minutes, heated to about 227° C. and held for 15 minutes, and finally heated to a cooking temperature of about 240° C. After one hour at 240° C., the acid number and viscosity of the reaction mixture are checked. Cooking should continue until an acid number of less than 10 is reached. Portion 4 is then added as needed to achieve a Gardner Holdt viscosity of about U-W, and the resulting polyester resin solution is cooled to room temperature.

III. Preparation of methyl methacrylate polymer solution

| | Parts |
|---|---|
| Portion 1 | |
| Methyl methacrylate monomer | 322.28 |
| Acetone | 112.71 |
| Toluene | 48.33 |
| Benzoyl peroxide | 2.18 |
| Portion 2 | |
| Acetone | 32.29 |
| Toluene | 290.29 |
| Total | 808.08 |

Portion 1 is premixed, charged into a reaction vessel, heated to about 100° C., and held at this temperature for about 1½ hours. Portion 2 is then added, and the resulting polymer solution is cooled to room temperature.

The polymer solution has a polymer solids content of about 40% and a relative viscosity of about 1.19 measured at 25° C. on a 0.5% polyer solids solution using dichloroethylene solvent.

IV. Preparation of the clear lacquer coating composition

| | Parts |
|---|---|
| Portion 1 | |
| Ethylene glycol monoethyl ether acetate | 62.09 |
| Toluene | 82.35 |
| Butyl benzyl phthalate | 7.79 |
| Methyl methacrylate/ethyl acrylate/t-butylaminoethyl acrylate polymer solution (prepared in step I.) | 285.20 |
| Cellulose acetate butyrate solution (25% cellulose acetate butyrate having a butyryl content of about 30–55% and a 1-second viscosity in a solvent of 3 parts ethylene glycol monoethyl ether acetate/46 parts acetone) | 155.63 |
| Tinuvin 144 ® hindered amine based ultraviolet light stabilizer and antioxidant (available from Ciba-Geigy Corporation) | 2.60 |
| Tinuvin 328 ® substituted benzotriazole (available from Ciba-Geigy Corporation) | 2.60 |
| Silicone solution (1% solids silicone in xylene) | 0.25 |
| Neopentyl glycol/adipic acid/benzoic acid polyester plasticizer (prepared in step II.) | 43.35 |
| Methyl methacrylate polymer solution (prepared in step III.) | 136.14 |
| Total | 778.00 |

The above constituents are added in the order shown and mixed for 1 hour, or until uniformity is obtained. The clear lacquer composition is reduced with acetone to a package viscosity of about 400–420 centipoise.

The lacquer is further reduced with a thinner of acetone/toluene/xylene in a ratio of 22.5/43.5/34, to a spray viscosity of about 32 seconds, measured at 25° C. with a No. 1 Fisher Cup.

The lacquer is sprayed onto the intended substrate, which oridinarily will be a primed and color-coated automotive panel, and is allowed to dry at room temperature for 24 hours.

The resulting color coat/clear coat finish exhibits good adhesion and commercially acceptable clarity, as demonstrated by the following tests.

A. Adhesion

Three sets of panels are prepared by applying three different clear lacquers over a weathered nonaqueous dispersion OEM enamel finish. The first lacquer is that of the present invention, containing t-butylaminoethyl methacrylate (t-BAEMA). The second lacquer is prepared according to the teachings of Meyer, U.S. Pat. No. 4,168,249. The third is a non-iminated lacquer prepared as in Meyer but containing no alkylene imine.

The adhesion of the clear lacquer topcoat to the pigmented basecoat is determined on these three sets of panels by scribing a rectangular grid through the topcoat to the metal with a knife, placing Scotch ® brand 610 cellophane tape of one-inch width over the grid, and then removing the tape.

A subjective rating of 10 indicates that none of the topcoat is removed by the tape, while a rating of 0 indicates that all of the topcoat is removed. The average rating for each topcoat is listed in the following table:

| No. | Type of Lacquer | Adhesion Rating |
|---|---|---|
| 1 | t-BAEMA | 8 |
| 2 | Meyer iminated | 8 |
| 3 | non-iminated | 3 |

The above results show that the lacquer of the present invention adheres as well as the Meyer iminated acrylic lacquer to a standard enamel finish. Although it is the primary amine in the Meyer lacquers that is responsible for the unacceptable yellowing, these results show that removal of the alkylene imine is not a viable solution since it also serves as an adhesion promoter.

B. Clarity

A clear Meyer lacquer formulated with an iminated acrylic resin containing a primary amine changes from a Gardner Holdt color of 1 to a Gardner Holdt color of 6, per ASTM D-1545-63, upon three months' shelf storage. The clear lacquer of the present invention, formulated with t-butylaminoethyl methacrylate, a secondary amine, changes color from 1 to 3 in a side-by-side test with the Meyer lacquer. This latter color change is commercially acceptable; the former is not.

The invention claimed is:

1. A clear coating composition consisting essentially of 5-40% by weight of a film-forming binder and 60-95% by weight of volatile organic solvents; wherein the binder consists essentially of:
  (a) about 0-65% by weight, based on the weight of the binder, of one or more polymers selected from the group consisting of poly(methyl methacrylate) and other copolymers of methyl methacrylate having a relative viscosity of about 1.17 to 1.20 measured at 25° C. on a 0.5% polymer solids solution using dichloroethylene solvent;
  (b) about 0-25% by weight, based on the weight of the binder, of cellulose acetate butyrate having a viscosity of about 1-20 seconds and a butyryl content of 30-55% by weight;
  (c) about 10-40% by weight, based on the weight of the binder, of a polyester plasticizer comprising the reaction product of a polyol and an organic dicarboxylic acid or an anhydride of an organic dicarboxylic acid having an acid number of 0.1-10;
  (d) about 0-10% by weight, based on the weight of the binder, of a phthalate plasticizer; and
  (e) about 15-80% by weight, based on the weight of the binder, of a terpolymer of about 20-90% by weight of units of methyl methacrylate, 2-40% by weight of units of ethyl acrylate, and 2-60% by weight of units of t-butylaminoethyl methacrylate;
wherein (a), (b), (c), (d), and (e) total 100%.

2. A composition according to claim 1 which contains in addition to the aforementioned constituents up to about 6% by weight, based on the weight of the film-forming binder, of one or more ultraviolet light stabilizers.

3. A composition according to claim 2 which contains about 0.5-3% by weight of an ultraviolet screener and about 0.5-3% by weight of a hindered amine light stabilizer.

4. A composition according to claim 1 wherein the cellulose acetate butyrate has a butyryl content of 35-40% by weight and a viscosity of 1-3 seconds.

5. A composition according to claim 1 wherein the polyester plasticizer contains an organic monocarboxylic acid in addition to the polyol and dicarboxylic acid or anhydride.

6. A composition according to claim 5 wherein the polyester plasticizer consists essentially of the reaction product of neopentyl glycol, adipic acid, and benzoic acid.

7. A composition according to claim 1 wherein the phthalate plasticizer is butyl benzyl phthalate.

8. A clear coating composition consisting essentially of 5-40% by weight of a film-forming binder and 60-95% by weight of volatile organic solvents; wherein the binder consists essentially of:
  (a) about 40-80% by weight, based on the weight of the binder, of poly(methyl methacrylate) having a relative viscosity of about 1.17 to 1.20 measured at 25° C. on a 0.5% polymer solids solution using dichloroethylene solvent;
  (b) about 5-25% by weight, based on the weight of the binder, of cellulose acetate butyrate having a viscosity of about 1-3 seconds and a butyryl content of 35-40% by weight;
  (c) about 15-25% by weight, based on the weight of the binder, of a polyester plasticizer consisting essentially of the reaction product of neopentyl glycol, adipic acid, and benzoic acid;
  (d) about 1-10% by weight, based on the weight of the binder, of butyl benzyl phthalate; and
  (e) about 2-20% by weight, based on the weight of the binder, of a terpolymer of about 20-90% by weight of units of methyl methacrylate, 2-40% by weight of units of ethyl acrylate, and 2-60% by weight of units of t-butylaminoethyl methacrylate
wherein (a), (b), (c), (d), and (e) total 100%.

9. A composition according to claim 8 wherein the terpolymer consists essentially of about 60-90% of methyl methacrylate, 10-20% of ethyl acrylate, and 2-20% of t-butylaminoethyl methacrylate.

10. A clear coating composition consisting essentially of 5-40% by weight of a film-forming binder and 60-95% by weight of volatile organic solvents; wherein the binder consists essentially of:
  (a) about 0-65% by weight, based on the weight of the binder, of one or more polymers selected from the group consisting of poly(methyl methacrylate) and other copolymers of methyl methacrylate having a relative viscosity of about 1.17 to 1.20 measured at 25° C. on a 0.5% polymer solids solution using dichloroethylene solvent;
  (b) about 5-25% by weight, based on the weight of the binder, of cellulose acetate butyrate having a viscosity of about 1-3 seconds and a butyryl content of 35-40% by weight;
  (c) about 10-40% by weight, based on the weight of the binder, of a polyester plasticizer consisting essentially of the reaction product of a polyol and an organic dicarboxylic acid or an anhydride of an organic dicarboxylic acid having a acid number of 0.1-10;
  (d) about 0-10% by weight, based on the weight of the binder, of a phthalate plasticizer; and
  (e) about 2-20% by weight, based on the weight of the binder, of poly(t-butylaminoethyl methacrylate);
wherein (a), (b), (c), (d), and (e) total 100%.

11. A composition according to claims 8 or 10 which contains in addition to the aforementioned constituents up to about 10% by weight, based on the weight of the film-forming binder, of one or more ultraviolet light stabilizers.

12. A composition according to claims 1, 8, or 10 which contains about 0.5-3% by weight of a 2-(o-hydroxyphenyl)benzotriazole ultraviolet screener and about 0.5-3% by weight of a hindered amine light stabilizer.

13. A substrate coated with a pigmented coating composition and subsequently coated with a clear coating composition according to claim 1 to form a color coat/clear coat finish.

* * * * *